(12) United States Patent
Tu et al.

(10) Patent No.: US 11,773,217 B2
(45) Date of Patent: Oct. 3, 2023

(54) PHOSPHORUS CONTAINING COMPOUNDS AND EPOXY RESINS THEREOF

(71) Applicant: CHANG CHUN PLASTICS CO., LTD., Taipei (TW)

(72) Inventors: An-Pang Tu, Taipei (TW); Ping-Chieh Wang, Taipei (TW); Gai-Chi Chen, Taipei (TW); Chun-Hsiung Kao, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 778 days.

(21) Appl. No.: 16/861,402

(22) Filed: Apr. 29, 2020

(65) Prior Publication Data
US 2021/0340319 A1  Nov. 4, 2021

(51) Int. Cl.
C08G 65/26 (2006.01)
B32B 5/02 (2006.01)
B32B 15/20 (2006.01)
B32B 15/14 (2006.01)

(52) U.S. Cl.
CPC ............ *C08G 65/2675* (2013.01); *B32B 5/02* (2013.01); *B32B 15/14* (2013.01); *B32B 15/20* (2013.01); *B32B 2250/40* (2013.01); *B32B 2260/021* (2013.01); *B32B 2260/046* (2013.01); *B32B 2262/101* (2013.01)

(58) Field of Classification Search
CPC .... C08G 65/2675; C08G 59/06; C08G 59/40; C08G 59/30; C08G 59/4028; B32B 5/02; B32B 15/14; B32B 15/20; B32B 2250/40; B32B 2260/021; B32B 2260/046; B32B 2262/101
USPC .............................................. 428/221, 299.4
See application file for complete search history.

(56) References Cited

U.S. PATENT DOCUMENTS

| 8,293,865 | B2 | 10/2012 | Lin et al. |
| 9,546,262 | B1 | 1/2017 | Tu et al. |
| 9,605,109 | B1 | 3/2017 | Tu et al. |
| 2012/0130126 | A1 | 5/2012 | Su et al. |
| 2019/0284402 | A1 | 9/2019 | Piotrowski et al. |

FOREIGN PATENT DOCUMENTS

| CN | 101880294 A | 11/2010 |
| CN | 106986893 A | 7/2017 |
| CN | 109983055 A | 7/2019 |
| JP | 2013040270 A | 2/2013 |
| JP | 2017088600 A | 5/2017 |
| TW | 201506054 A | 2/2015 |
| TW | I643881 B | 12/2018 |

OTHER PUBLICATIONS

Chinese Office Action dated Apr. 8, 2023, for corresponding Chinese Application No. 20211037579.X.
Japanese Notice of Allowance dated May 1, 2023, for corresponding Japanese Application No. 2021-068399.
Japanese Office Action dated Mar. 15, 2022, for corresponding Japanese Application No. 2021-068399.
Japanese Office Action dated Sep. 6, 2022, for corresponding Japanese Application No. 2021-068399.
Chinese Notice of Allowance dated Jul. 27, 2022, for corresponding Chinese Application No. 11120727300.
Soumendu Bisoi et al., "Soluble, optically transparent polyamides with a phosphaphenanthrene skeleton: syntesis, characterization, gas permeation and molecular dynamics simulations," Polymer Chemistry, 2017, pp. 1-13.
Ching Hsuan Lin et al., "Synthesis of a Phosphinated Acetoxybenzonic Acid and Its Application in Enhancing Tg and Flame Retardancy of Poly(ethylene terephthalate)," Polymer Chemistry, Journal of Polymer Science, vol. 52, 2014. pages: 424-434.

*Primary Examiner* — Camie S Thompson
(74) *Attorney, Agent, or Firm* — POLSINELLI PC

(57) ABSTRACT

Phosphorous containing compounds, epoxy resins thereof, and laminate composite structures thereof. The phosphorus containing compounds may have a structure according to formula (I):

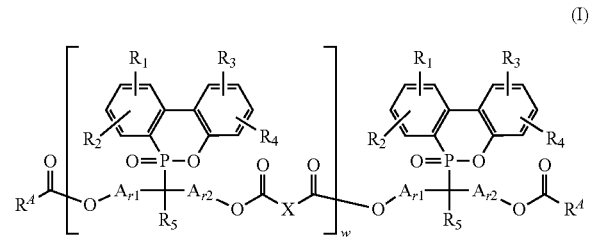

wherein, X is an aromatic hydrocarbon group having 6 to 30 carbon atoms or a bivalent linear or branched alkylene group of 1 to 8 carbon atoms; $R^A$ is selected from an alkyl group having 1 to 6 carbon atoms, a phenyl group, a napthyl group, and an aromatic phenol group; w is an integer of 1 to 9; $R_1$, $R_2$, $R_3$, and $R_4$ are independently selected from H, $C_1$-$C_{10}$ alkyl, $C_1$-$C_{10}$ alkoxy, and $C_3$-$C_{10}$ cycloalkyl; $R_5$ is selected from the group consisting of $C_1$-$C_{10}$ alkyl, $C_1$-$C_{10}$ alkoxy, $C_3$-$C_{10}$ cycloalkyl, and $Ar_3$; and $Ar_1$ and $Ar_2$ are independently selected.

20 Claims, No Drawings

PHOSPHORUS CONTAINING COMPOUNDS AND EPOXY RESINS THEREOF

FIELD OF THE DISCLOSURE

The instant disclosure is directed to phosphorous containing compounds, epoxy resins thereof, and laminate composite structures thereof.

BACKGROUND OF THE DISCLOSURE

Due to good resistance to solvents, excellent mechanical strength, and electrically insulating properties, etc., epoxy resins are widely used. For example, epoxy resins are often applied to coating materials, electrically insulating materials, printed circuit laminated boards and electronic packaging materials, construction and building materials, adhesives, and navigation technology. Epoxy resins, however, can have poor thermal resistance and burn easily, which may set significant restriction on the uses of such epoxy resins.

With the development of high-performance and networked signal communication equipment, in order to process a large number of signals for high-speed transmission, the operation signals are moving toward high speed and high frequency transmission. In order to achieve the above object, the material of the printed circuit board of the signal communication device needs to have good dielectric capability (low dielectric constant and low loss dissipation factor) to meet the needs of high frequency transmission of signals, and good heat resistance and machinability to meet the reliability of printed circuit boards.

Therefore, with development of electronic technology, the industry has sought to improve flame retardant properties and thermal resistance of epoxy resins. There has been a plurality of techniques available for improving the flame retardant properties of epoxy resins, the most common one of which is to introduce a flame retardant into an epoxy resin. Often, a halogen-containing flame retardant is used. Although halogens are effective for retarding flames, they can produce erosive and toxic hydrogen halide gases. Additionally, the use of halogenation of epoxy resins sometimes leads to environmental concerns.

SUMMARY OF THE DISCLOSURE

Aspects of the disclosure relate to phosphorous containing compounds, epoxy resins thereof, and laminate composite structures thereof. Additional aspects of the disclosure relate to methods for producing such phosphorous containing compounds and epoxy resins. The phosphorous containing compounds may be used to form flame retardant phosphorous containing resins, such as epoxy resins, as well as server as a hardener for such resins.

According to a first aspect of the disclosure, provided is phosphorous containing compounds having a structure represented by formula (I), provided below:

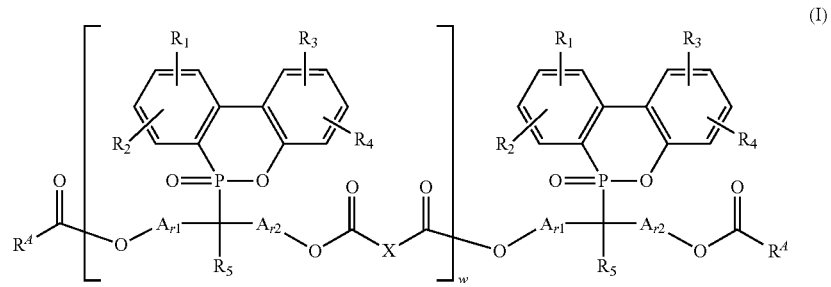

(I)

wherein,

X is an aromatic hydrocarbon group having 6 to 30 carbon atoms or a bivalent linear or branched alkylene group of 1 to 8 carbon atoms, $R^A$ is selected from an alkyl group having 1 to 6 carbon atoms, a phenyl group, a napthyl group, and an aromatic phenol group, w is an integer of 1 to 9, $R_1$, $R_2$, $R_3$, and $R_4$ are independently selected from H, $C_1$-$C_{10}$ alkyl, $C_1$-$C_{10}$ alkoxy, and $C_3$-$C_{10}$ cycloalkyl, $R_5$ is selected from the group consisting of $C_1$-$C_{10}$ alkyl, $C_1$-$C_{10}$ alkoxy, $C_3$-$C_{10}$ cycloalkyl, and $Ar_3$, and $Ar_1$ and $Ar_2$ are independently selected from the following structure:

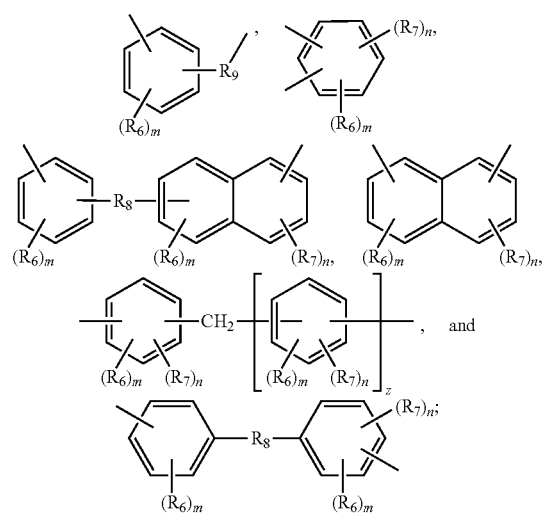

wherein $Ar_3$ is selected from the following structures:

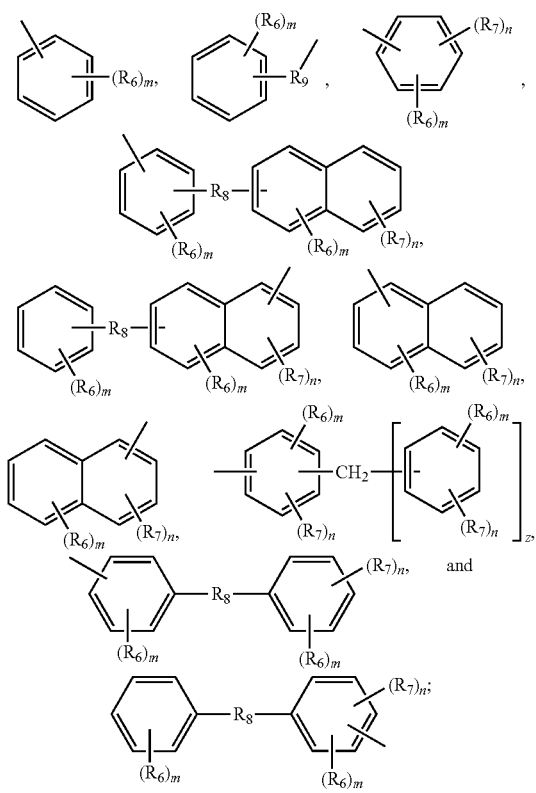

wherein:
$R_6$ and $R_7$ are independently selected from the group consisting of H, $C_1$-$C_{10}$ alkyl group, $C_1$-$C_{10}$ alkoxy, and a cyclic alkyl group having 3-10 carbon atoms,
m and n are independently an integer from 0 to 3, and m plus n is less than 5.
$R_8$ is absent or is selected from the group consisting of —$CH_2$—, —$(CH_3)_2C$—, —CO—, —$SO_2$—, and —O—, and
$R_9$ is absent or is —$(CH_2)_p$, wherein p is an integer from 1 to 20, and z is 1.

The X group may be a bivalent aromatic hydrocarbon group containing from 6 to 30 carbon atoms, a bivalent linear or branched alkylene group containing from 1 to 8 carbon atoms, or a bivalent linear or branched alkenylene group containing from 2 to 8 carbon atoms. In some instances, the X group is an aromatic hydrocarbon group having 6 to 10 carbon atoms. In further instances, the X groups is an aromatic hydrocarbon having 6 to 8 carbon atoms. The aromatic hydrocarbon of X may be unsubstituted.

The $R^A$ group may be an aromatic phenol group, such as those selected from a phenol group, an o-cresol group, a m-cresol group, p-cresol group, an 1-naphthol group. Alternatively, the $R^A$ group may be an alkyl group having 1 to 4 carbon atoms. For example, the alkyl group of $R^A$ may have 2 carbon atoms or 1 carbon atom. Additionally or alternatively, the $R^A$ group may be an unsubstituted alkyl group.

In some instances, the phosphorous containing compounds according to formula (I) have a structure wherein $R_1$, $R_2$, $R_3$, and $R_4$ are H; $R_5$ is a methyl; and $Ar_1$ and $Ar_2$ are phenylene groups. For example, the phosphorous containing compounds according to formula (I) may include the following structure (Ia):

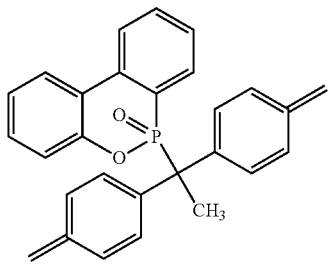

(Ia)

In at least one case, the phosphorous containing compounds according to formula (I), wherein $R_1$, $R_2$, $R_3$, and $R_4$ are H; $R_5$ is a methyl; $Ar_1$ and $Ar_2$ are phenylene groups; X is an unsubstituted aromatic hydrocarbon group; $R^A$ is an alkyl group having a carbon atom.

According to a further aspect of the disclosure, provided is a cured epoxy resin comprising an epoxy and the phosphorus containing compound(s) according to formula (I). The cured epoxy resin preferably has a glass transition temperature of greater than 170° C. For example, the glass transition temperature of the cured epoxy resin may be 180° C. or more, 190° C. or more, 200° C. or more. Additionally or alternatively, an epoxy resin cured with the phosphorus containing compound(s) of the disclosure may have a dielectric constant of 3.0 or less as measured according to IPC-TM-650-2.5.5.13 at 10 GHz. The cured epoxy resin may also or alternatively have a dissipation factor of 0.014 or less as measured according to IPC-TM-650-2.5.5.13 at 10 GHz.

In accordance with yet another aspect of the disclosure, a laminate composite structure is provided comprising (a) a glass fiber fabric, (b) an epoxy, (c) a copper foil, and (d) a phosphorus containing compound according to formula (I). The laminate composite structure may have a cured epoxy resin containing the phosphorous containing compound(s) according to formula (I), where $R_1$, $R_2$, $R_3$, and $R_4$ are H; $R_5$ is a methyl; and $Ar_1$ and $Ar_2$ are phenylene groups. In at least one case, the laminate composite structure includes a cured epoxy resin containing phosphorous containing compound(s) wherein $R_1$, $R_2$, $R_3$, and $R_4$ are H; $R_5$ is a methyl; $Ar_1$ and $Ar_2$ are phenylene groups; X is an unsubstituted aromatic hydrocarbon group; $R^A$ is an alkyl group having a carbon.

The laminate composite structure preferably has a dielectric constant of 4.6 or less, 4.5 or less, 4.4 or less, or 4.3 or less as measured according to IPC-TM-650-2.5.5.13 at 10 GHz. Additionally or alternatively, laminate composite structure may have a dissipation factor of 0.015 or less, 0.014 or less, 0.013 or less, 0.012 or less, 0.010 or less, or 0.009 or less as measured according to IPC-TM-650-2.5.5.13 at 10 GHz.

DETAILED DESCRIPTION OF THE DISCLOSURE

Aspects of the disclosure relate to phosphorous containing compounds, epoxy resins thereof, and laminate composite structures thereof. The inventors discovered that phosphorus containing compounds for curing an epoxy resin could be improved by forming a compound containing DMP compounds and replacing the hydroxyl groups with acyloxy groups (—O—(C═O)—R). Without being limited to any specific theory, the inventors believe that the phosphorous containing compounds of the instant disclosure have reduced water absorption and improved dielectric properties over curing agents with hydroxyl groups because such hydroxyl groups are suspected to produce strong polarities within the cured resin.

More specifically, the Inventor's discovered that epoxy resins cured with certain phosphorous containing compounds, such as those produced from DMP and particular dicarboxylic acids and anhydrides, exhibited improved dielectric properties and thermal resistance while also maintaining a high level of flame retardancy. The improvements in dielectric properties and thermal properties while maintaining and/or improve the level of flame retardancy was unexpected.

According to a first aspect of the disclosure, provided is a phosphorous compound having a structure represented by formula (I), provided below:

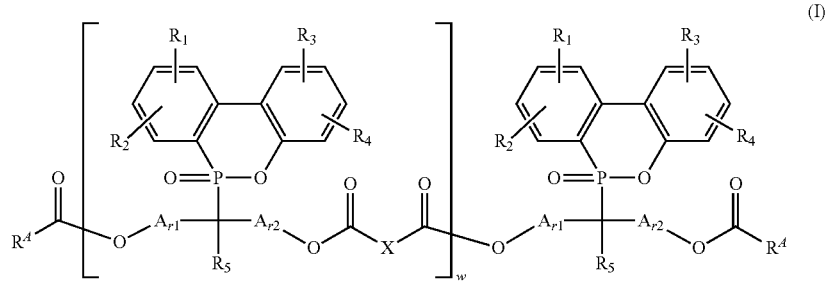

wherein,

X is an aromatic hydrocarbon group having 6 to 30 carbon atoms or a bivalent linear or branched alkylene group of 1 to 8 carbon atoms, $R^A$ is selected from an alkyl group having 1 to 6 carbon atoms, a phenylene group, a napthyl group, and an aromatic phenol group, w is an integer of 1 to 9, $R_1$, $R_2$, $R_3$, and $R_4$ are independently selected from H, $C_1$-$C_{10}$ alkyl, $C_1$-$C_{10}$ alkoxy, and $C_3$-$C_{10}$ cycloalkyl, $R_5$ is selected from the group consisting of $C_1$-$C_{10}$ alkyl, $C_1$-$C_{10}$ alkoxy, $C_3$-$C_{10}$ cycloalkyl, and $Ar_3$, and $Ar_1$ and $Ar_2$ are independently selected from the following structure:

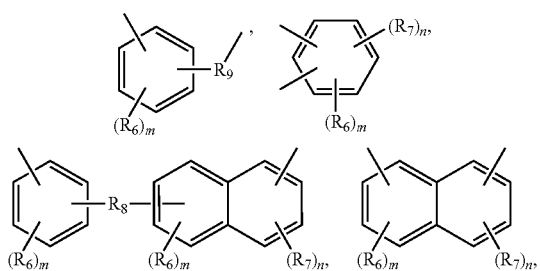

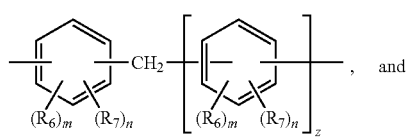

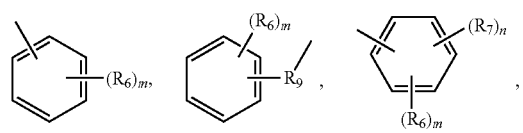

wherein $Ar_3$ is selected from the following structures:

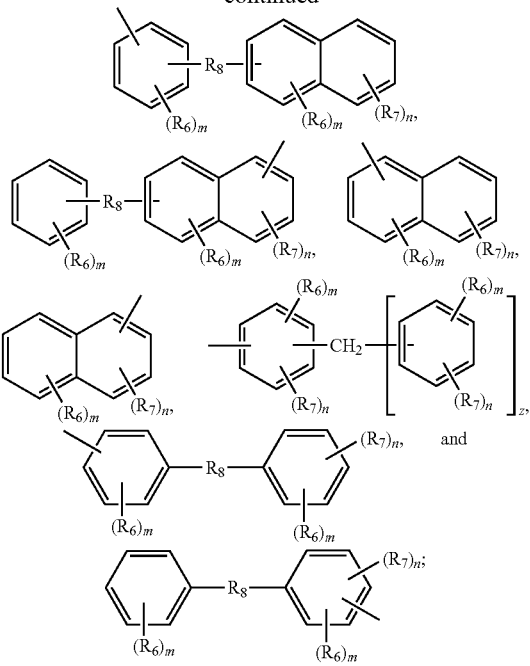

wherein:

$R_6$ and $R_7$ are independently selected from the group consisting of H, $C_1$-$C_{10}$ alkyl group, $C_1$-$C_{10}$ alkoxy, and a cyclic alkyl group having 3-10 carbon atoms, m and n are independently an integer from 0 to 3, and m plus n is less than 5, $R_8$ is absent or is selected from the group consisting of —$CH_2$—, —$(CH_3)_2C$—, —CO—, —$SO_2$—, and —O—, and $R_9$ is absent or is —$(CH_2)_p$, wherein p is an integer from 1 to 20, and z is 1.

The X group is typically an aromatic hydrocarbon group having 6 to 30 carbon atoms or a bivalent linear or branched alkylene group of 1 to 8 carbon atoms. Preferably, the X group is an aromatic hydrocarbon group having 6 to 20 carbon atoms, e.g., 6 to 18 carbon atoms, 6 to 16 carbon atoms, 6 to 14 carbon atoms, 6 to 12 carbon atoms, or 6 to 10 carbon atoms. In some instances, the X group is an aromatic hydrocarbon group having 6 to 8 carbon atoms. Alternatively, the X group may be a bivalent linear or branched alkylene group having 7 carbon atoms, 6 carbon atoms, 5 carbon atoms, 4 carbon atoms, 3 carbon atoms, 2 carbon atoms, 1 carbon atom, or any range therebetween. Although the X group is preferably unsubstituted, the aromatic group may be substituted in various instances. In some cases, the X group may have a structure corresponding isophthalic acid, terephthalic acid, dibenzoic acid, naphthalenedicarboxylic acids, 4,4'-diphenylenedicarboxylic acid, bis(p-carboxyphenyl)methane acid, ethylenebis(p-benzoic acid), 1,4-tetramethylenebis(p-oxybenzoic acid), ethylenebis(paraoxybenzoic acid), 1,3-trimethylene bis(p-oxybenzoic acid), isophthaloyl dichloride, terephthaloyl dichloride, malonyl dichloride, or a derivative thereof. For example, the X group may be formed by reacting one of the foregoing acids with additional compound, as further discussed below, to form the phosphorous containing compound of the instant disclosure.

Typically, the $R^A$ group is an aromatic phenol group, such as those selected from a phenol group, an o-cresol group, a m-cresol group, a p-cresol group, an 1-naphthol group. The aromatic phenol group of $R^A$ may have 1 to 10 carbon atoms including, e.g., 1 to 8 carbon atoms, 1 to 7 carbon atoms, or 1 to 6 carbon atoms. In some instances, the $R^A$ group may be an alkyl group having 1 to 10 carbon atoms. For example, the $R^A$ group may be an alkyl group including 1 to 6 carbon atoms, 1 to 4 carbon atoms, 1 to 3 carbon atoms, etc. In a preferred example, the alkyl group of $R^A$ has 2 carbon atoms or 1 carbon atom. Additionally or alternatively, the $R^A$ group may be an aromatic group or an alkyl group that is substituted or unsubstituted.

$R_1$, $R_2$, $R_3$, and $R_4$ are generally independently selected from H, $C_1$-$C_{10}$ alkyl, $C_1$-$C_{10}$ alkoxy, and $C_3$-$C_{10}$ cycloalkyl. Although the groups of $R_1$, $R_2$, $R_3$, and $R_4$ may each be independently selected to have a different structure, in some cases $R_1$, $R_2$, $R_3$, and $R_4$ may be selected such that two of the groups, three of the groups, or all of the groups have the same structure. $R_1$, $R_2$, $R_3$, and $R_4$ may be independently selected from hydrogen, $C_1$-$C_4$ unsubstituted alkyl, $C_1$-$C_4$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl. For instance, $R_1$, $R_2$, $R_3$, and $R_4$ may be selected from substituted or unsubstituted alkyl groups having 10 carbon atoms, 9 carbon atoms, 8 carbon atoms, 7 carbon atoms, 6 carbon atoms, 5 carbon atoms, 4 carbon atoms, 3 carbon atoms, 2 carbon atoms, 1 carbon atom, or any range formed therefrom. $R_1$, $R_2$, $R_3$, and $R_4$ may be selected from a $C_1$-$C_{10}$ alkoxy groups selected from substituted or unsubstituted alkoxy groups having 10 carbon atoms, 9 carbon atoms, 8 carbon atoms, 7 carbon atoms, 6 carbon atoms, 5 carbon atoms, 4 carbon atoms, 3 carbon atoms, 2 carbon atoms, 1 carbon atom, or any range formed therefrom. Additionally or alternatively, $R_1$, $R_2$, $R_3$, and $R_4$ may be selected from $C_3$-$C_{10}$ cycloalkyl groups that are substituted or unsubstituted. In some cases, the $C_3$-$C_{10}$ cycloalkyl group of $R_5$ includes 10 carbon atoms, 9 carbon atoms, 8 carbon atoms, 7 carbon atoms, 6 carbon atoms, 5 carbon atoms, 4 carbon atoms, 3 carbon atoms or any range formed therefrom. In some embodiments, $R_1$, $R_2$, $R_3$, and $R_4$ are independently selected from the group consisting of hydrogen, methyl, ethyl, isopropyl, n-propyl, n-butyl, and tert-butyl. In some embodiments, $R_1$, $R_2$, $R_3$, and $R_4$ are hydrogen.

$R_5$ is typically independently selected from the group consisting of $C_1$-$C_{10}$ alkyl, $C_1$-$C_{10}$ alkoxy, $C_3$-$C_{10}$ cycloalkyl, and $Ar_3$. $R_5$ may be selected from $C_1$-$C_{10}$ alkyl groups that are substituted or unsubstituted. For instance, $R_5$ may be selected from substituted or unsubstituted alkyl groups having 10 carbon atoms, 9 carbon atoms, 8 carbon atoms, 7 carbon atoms, 6 carbon atoms, 5 carbon atoms, 4 carbon atoms, 3 carbon atoms, 2 carbon atoms, 1 carbon atom, or any range formed therefrom. $R_5$ may be selected from a $C_1$-$C_{10}$ alkoxy groups selected from substituted or unsubstituted alkoxy groups having 10 carbon atoms, 9 carbon atoms, 8 carbon atoms, 7 carbon atoms, 6 carbon atoms, 5 carbon atoms, 4 carbon atoms, 3 carbon atoms, 2 carbon atoms, 1 carbon atom, or any range formed therefrom. Additionally or alternatively, $R_5$ may be selected from $C_3$-$C_{10}$ cycloalkyl groups that are substituted or unsubstituted. In some cases, the $C_3$-$C_{10}$ cycloalkyl group of $R_5$ includes 10 carbon atoms, 9 carbon atoms, 8 carbon atoms, 7 carbon atoms, 6 carbon atoms, 5 carbon atoms, 4 carbon atoms, 3 carbon atoms or any range formed therefrom. $R_5$ may also be selected from groups having a structure according to $Ar_3$, as shown below:

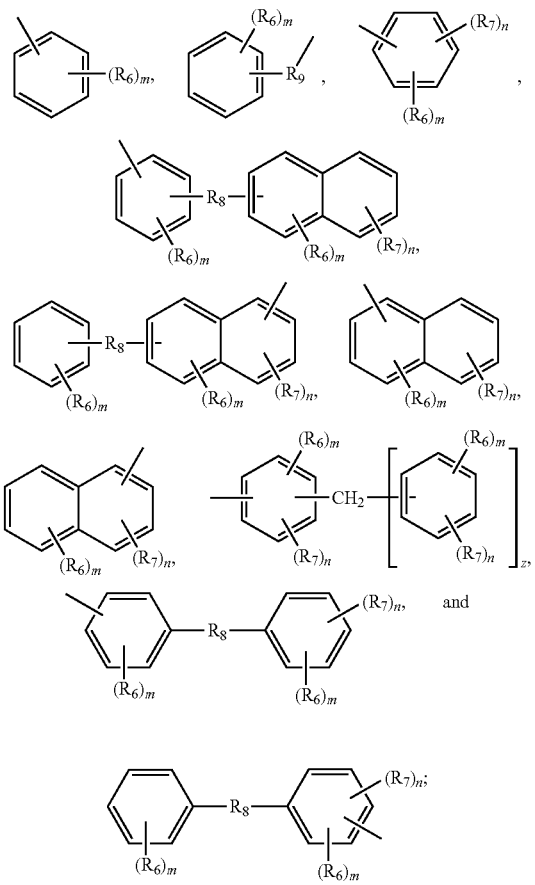

Typically, the groups of $Ar_1$ and $Ar_2$ are independently selected from the following structures:

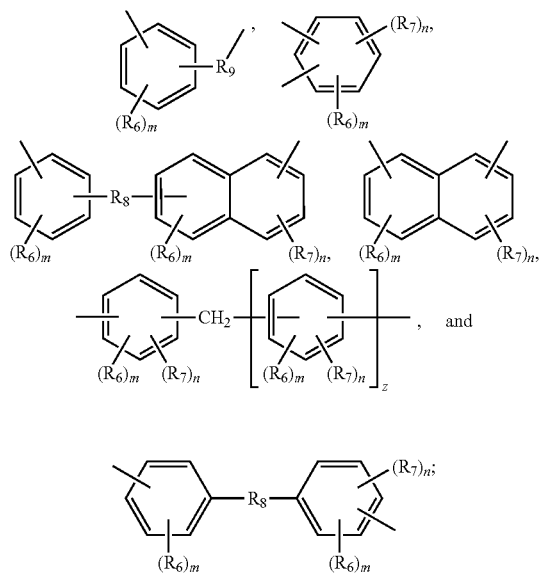

Although $Ar_1$ and $Ar_2$ may be groups having different structures, in some cases $Ar_1$ and $Ar_2$ are groups having the same structure. $R_6$ and $R_7$ are independently selected from the group consisting of H, $C_1$-$C_{10}$ alkyl group, $C_1$-$C_{10}$ alkoxy, and a cyclic alkyl group having 3-10 carbon atoms. In some instances, however, the groups of $R_6$ and $R_7$ may be the same. The $R_6$ and $R_7$ may be selected from substituted or unsubstituted alkyl groups having 1 to 10 carbon atoms. For instance, $R_6$ and $R_7$ may be selected from substituted or unsubstituted alkyl groups having 10 carbon atoms, 9 carbon atoms, 8 carbon atoms, 7 carbon atoms, 6 carbon atoms, 5 carbon atoms, 4 carbon atoms, 3 carbon atoms, 2 carbon atoms, 1 carbon atom, or any range formed therefrom. $R_6$ and $R_7$ may each be independently selected from a $C_1$-$C_{10}$ alkoxy groups selected from substituted or unsubstituted alkoxy groups having 10 carbon atoms, 9 carbon atoms, 8 carbon atoms, 7 carbon atoms, 6 carbon atoms, 5 carbon atoms, 4 carbon atoms, 3 carbon atoms, 2 carbon atoms, 1 carbon atom, or any range formed therefrom. $R_6$ and $R_7$ may each be independently may be selected from $C_3$-$C_{10}$ cycloalkyl groups that are substituted or unsubstituted. In some cases, the $C_3$-$C_{10}$ cycloalkyl group of $R_5$ includes 10 carbon atoms, 9 carbon atoms, 8 carbon atoms, 7 carbon atoms, 6 carbon atoms, 5 carbon atoms, 4 carbon atoms, 3 carbon atoms or any range formed therefrom.

The repeating unit value ("w") is typically an integer of 1 to 9, such as 1, 2, 3, 4, 5, 6, 7, 8, or 9. Preferably, the w value ranges from 2 to 9. The inventors discovered that when the w value is 10 or more, the phosphorous containing compound tends to exhibit precipitation during curing and the processability of epoxy resin becomes poor. To reduce precipitation during curing, additional solvent (such as methyl ethyl ketone, "MEK") may be used. However, the use of additional solvent also results in a reduced viscosity for the epoxy resin. Thus, when the w value is 10 or more, the properties of the epoxy resin may be limited as a result of precipitation concerns and/or poor processability. Unexpectedly, however, the inventors discovered that when the w value ranges from 2 to 9, the processability of the epoxy resin is significantly improved and precipitation is unlikely.

The phosphorous containing compounds may be substantially free of or free of epoxide and/or oxirane groups. In some instances, the phosphorous containing compounds are substantially free of or free of hydroxyl groups.

In at least one embodiment, the phosphorous containing compound according to formula (I) has a structure wherein $R_1$, $R_2$, $R_3$, and $R_4$ are H; $R_5$ is a methyl; and $Ar_1$ and $Ar_2$ are phenylene groups, such that the phosphorous containing compound of formula (I) includes structure (Ia), below:

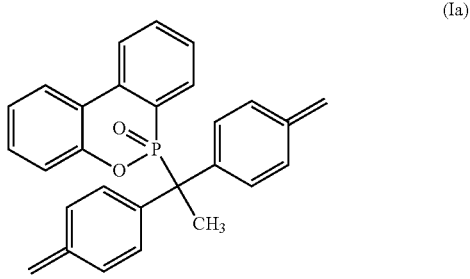

(Ia)

In at least one other embodiment, the phosphorous containing compound has a structure according to formula (II), provided below.

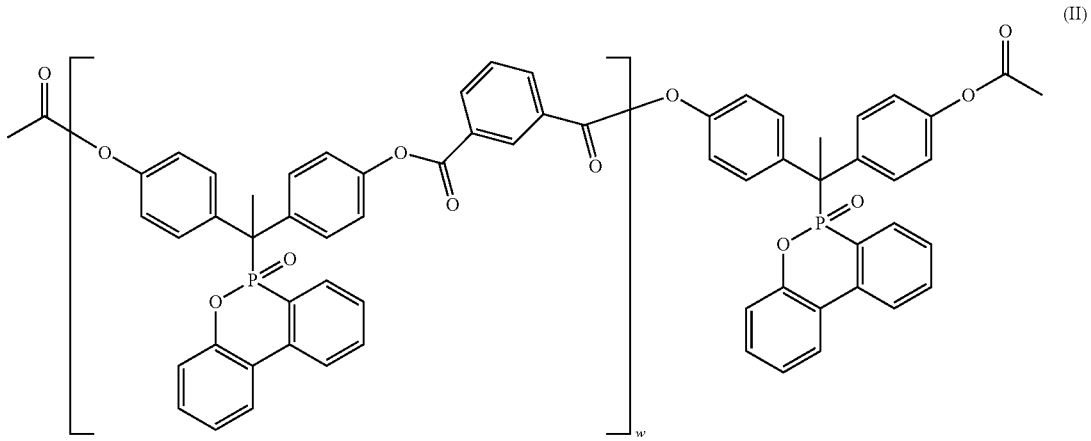

(II)

In accordance with another aspect of the disclosure, a method is provided for producing the phosphorous containing compounds. The method typically includes reacting 6-(1,1-bis(4-hydroxyphenyl)ethyl)dibenzo[c,e][1,2]oxaphosphinine 6-oxide ("DMP") compounds with an acid anhydride and an acid or chloride. The acid anhydride may be selected from acids anhydrides having a carbon chain of 1 to 6 carbon atoms. For example, the acid anhydride may be acetic anhydride, propionic anhydride, n-butyric anhydride, benzoic anhydride, trifluoroacetic anhydride, and/or 3a-methyl-5,6-dihydro-4H-isobenzofuran-1,3-dione. Preferably, the acid anhydride is acetic anhydride.

The acid may be a dicarboxylic acid. Additionally or alternatively, the acid or chloride may be selected from isophthalic acid, terephthalic acid, dibenzoic acid, naphthalenedicarboxylic acids, 4,4'-diphenylenedicarboxylic acid, bis(p-carboxyphenyl)methane acid, ethylenebis(p-benzoic acid), 1,4-tetramethylenebis(p-oxybenzoic acid), ethylenebis(paraoxybenzoic acid), 1,3-trimethylene bis(p-oxybenzoic acid), isophthaloyl dichloride, terephthaloyl dichloride, malonyl dichloride, a salt thereof, a derivative thereof, and a combination thereof. In at least one instance, the method includes reacting DMP with acetic anhydride and isophthalic acid to produce the phosphorous containing compounds of formula (I).

The DMP and the dicarboxylic acid and/or chloride may be in the mixture together at a molar ratio of DMP to dicarboxylic acid and/or chloride of 2:1 to 10:8.9. For example, the molar ratio of DMP to dicarboxylic acid and/or chloride may be 1.9:1 to 10:8.9, 1.8:1 to 10:8.9, 1.7:1 to 10:8.9, 1.6:1 to 10:8.9, or 1.5:1 to 10:8.9. Preferably, the DMP and the dicarboxylic acid and/or chloride may be mixed together in amounts such that the phosphorous containing compound of the disclosure has a repeating unit value ("w") of 2 to 9, as discussed further above.

The mixture comprising the DMP compound, acid anhydride, and/or acid and/or chloride may be heated to promote a reaction between the DMP compound, acid anhydride and/or the acid. For instance, the temperature of the mixture may be raised to 30° C. or more, e.g., 40° C. or more, 50° C. or more, 60° C. or more, 70° C. or more, 80° C. or more, 90° C. or more, 100° C. or more, 110° C. or more, 120° C. or more, 130° C. or more, or 140° C. or more. The temperature may be maintained at the raised temperature for 1 hour (hr) or more, 2 hrs or more, 3 hrs or more, 4 hrs or more, 5 hrs or more, 6 hrs or more, or 7 hrs or more.

The method may include removing acetic acid or other byproducts by distillation. One of ordinary skill would be able to readily determine methods and suitable equipment for removing the acetic acid by distillation based on the disclosure herein. Although, the method may include the removal of acetic acid by distillation, other means for removing the acetic acid may be utilize without deviating from the scope of the disclosure.

The compound of Formula (I) may have a phosphorus content of at least 2%. In various embodiments, the compound of Formula (I) may have a phosphorus content of at least 2.3%, at least 2.5%, at least 3.0%, at least 4.0%, at least 5.0%, or greater than 5.0%.

According to a further aspect of the disclosure, provided is an epoxy resin cured with the phosphorous containing compounds disclosed herein. The ideal equivalence ratio of the epoxy to the phosphorous containing compounds of formula (I) is preferably from 1:1 to 1:3. In some instances, the ideal equivalence ratio of the epoxy to the phosphorous containing compounds of formula (I) may be 1:1 to 1:2.8, 1:1 to 1:2.6, 1:1 to 1:2.4, 1:1 to 1:2.2, 1:1 to 1:2, 1:1 to 1:1.8, 1:1 to 1:1.6, or 1:1 to 1:1.5. Although all of the curing agent in the epoxy resin may be phosphorus containing compounds of formula (I), in some instances the foregoing amounts of curing agent comprise an additional curing agent.

The cured epoxy resin preferably has a glass transition temperature of greater than 180° C. For example, the glass transition temperature of the cured epoxy resin may be 182° C. or more, 184° C. or more, 186° C. or more, 188° C. or more, 190° C. or more, 192° C. or more, 194° C. or more, 196° C. or more, 198° C. or more, or 200° C. or more.

Additionally or alternatively, an epoxy resin cured with the phosphorus containing compounds of the disclosure may have a dielectric constant of 4.5 or less as measured according to IPC-TM-650-2.5.5.13 at 10 GHz. For instant, the dielectric constant of the cured epoxy resin may be 4.4 or less, 4.35 or less, or 4.3 or less, as measured according to IPC-TM-650-2.5.5.13 at 10 GHz. In some cases, the epoxy resin cured with the phosphorus containing compounds may have a dielectric constant of 3.4 or less, 3.3 or less, 3.2 or less, 3.1 or less, or 3.05 or less, 3.0 or less, 2.9 or less, 2.8 or less, or 2.7 or less, as measured according to IPC-TM-650-2.5.5.13 at 10 GHz. The epoxy resin cured with the phosphorous containing compounds of the disclosure may also or alternatively have a dissipation factor of 0.014 or less as measured according to IPC-TM-650-2.5.5.13 at 10 GHz. For example, the cured epoxy resin may have a dissipation factor of 0.011 or less, 0.0109 or less, 0.0105 or less, 0.0100 or less, or 0.0097 or less, as measured according to IPC-TM-650-2.5.5.13 at 10 GHz.

In accordance with yet another aspect of the disclosure, a laminate composite structure is provided comprising glass fiber fabric impregnated with a cured epoxy resin, the cured epoxy resin containing phosphorus containing compounds according to formula (I). The laminate composite structure may be produced by impregnating glass fiber with an epoxy resin and curing the epoxy resin with the phosphorous containing compounds of the disclosure and, optionally, one or more additional curing agents. The cured epoxy impregnated fiber fabrics may be applied to a substrate, such as a copper foil, circuit boards, circuitry components, or other electrically conductive materials. The epoxy impregnated fiber fabrics and substrate structure may be laminated to form a laminate composite structure.

In some instances, the laminate composite structure has a cured epoxy resin containing the phosphorous containing compounds according to formula (I), where $R_1$, $R_2$, $R_3$, and $R_4$ are H; $R_5$ is a methyl; and $Ar_1$ and $Ar_2$ are phenylene groups. In at least one case, the laminate composite structure includes a cured epoxy resin containing phosphorous containing compounds according to formula (II), provided below.

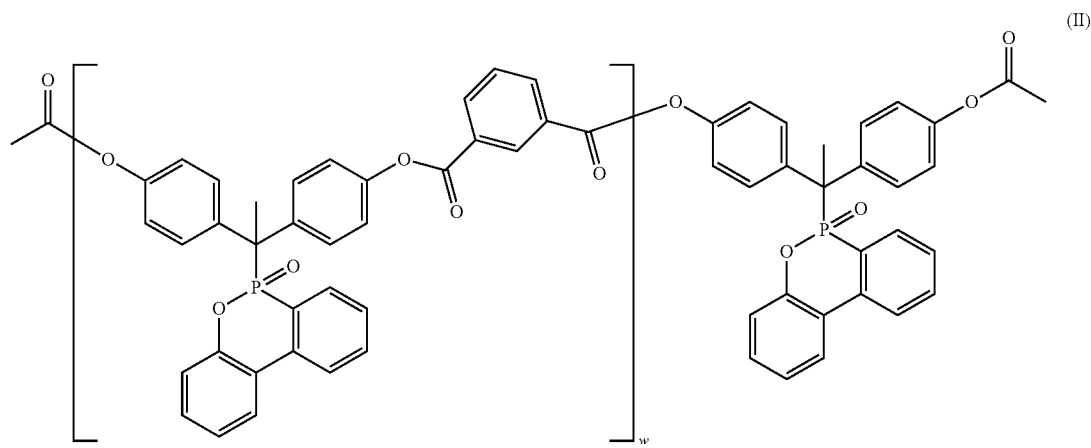

The laminate composite structure comprising an epoxy resin cured with a phosphorous compound disclosed herein preferably has a dielectric constant of 4.6 or less as measured according to IPC-TM-650-2.5.5.13 at 10 GHz. For instance, the dielectric constant of the laminate composite structure may be 4.4 or less, 4.35 or less, or 4.3 or less, as measured according to IPC-TM-650-2.5.5.13 at 10 GHz.

The laminate composite structure comprising an epoxy resin cured with a phosphorous compound disclosed herein may also have a dissipation factor of 0.015 or less as measured according to IPC-TM-650-2.5.5.13 at 10 GHz. For example, the laminate composite structure may have a dissipation factor of 0.014 or less, 0.011 or less, 0.0109 or less, 0.0105 or less, 0.0100 or less, 0.0097 or less, as measured according to IPC-TM-650-2.5.5.13 at 10 GHz.

EXAMPLES

The following non-limiting examples are provided primarily for the purposes of elucidating benefits and advantages achieved by aspects of the invention.

Example 1

Synthesis of DMP1

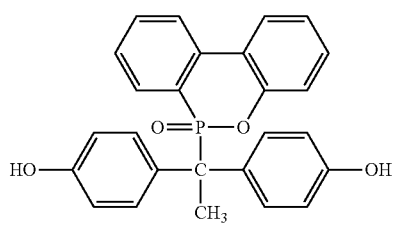

DMP 1

DMP 1 was prepared according to the following procedure for use in the following examples. Specifically, 216.2 grams ("g") (1 mole) of 9,10-dihydro-9-oxa-10-phospha-phenanthrene-10-oxide ("DOPO"), 470.5 g (5 mole) of phenol, 136.2 g (1 mole) of 4'-hydroxyacetophenone, and 8.65 g (4 wt. %, based on the weight of DOPO) of p-toluenesulfonic acid were mixed and stirred in a 3000 ml three-necked flask reactor at room temperature in advance. The foregoing reactants were stirred constantly at a temperature of 130° C. for 6 hours ("hrs") to form a mixture, and then the temperature of the mixture was cooled to room temperature. The cooled mixture was separated to obtain the crude products, which were washed with ethanol and then filtrated and dried. A phosphorus-containing bisphenol product A1 ("DMP 1") was obtained in the form of a white powder. The structure of DMP 1 is provided above.

Synthesis of DMP 2

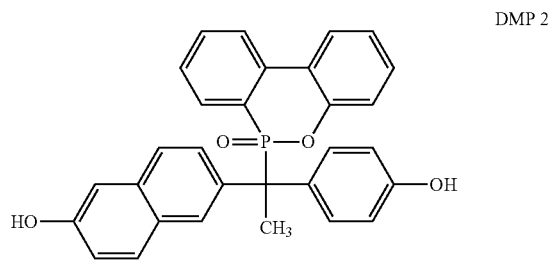 [SMILES: CC(c1ccc(O)cc1)(c1ccc2cc(O)ccc2c1)P1(=O)Oc2ccccc2-c2ccccc21]

DMP 2

DMP 2 was prepared by mixing and stirring 10.81 g (0.05 mole) of DOPO, 36 g (0.25 mole) of 2-naphthol, 6.81 g (0.05 mole) of 4'-Hydroxyacetophenone, and 0.432 g (4 wt % based on the Weight of DOPO) of p-toluene sulfonic acid in a 250 ml three-necked flask reactor at room temperature. The reactants were stirred constantly at 130° C. for 24 hours to form a mixture, and then the temperature of the mixture was cooled down to the room temperature. The crude products were separated out from the cooled mixture and washed using ethanol and then filtrated and dried to obtain a white powder. The white powder was the phosphorus-containing compound $A_2$ ("DMP 2").

The yield of the foregoing phosphorus-containing bisphenol was 85%, and the melting point was 317° C. The measured value of the carbon, hydrogen, and oxygen element was 75.54%, 4.58%, and 13.56%, respectively (the theoretical value of C was 75.31%, 4.85% for H, 13.38% for O) by element analysis.

Synthesis of DMP 3

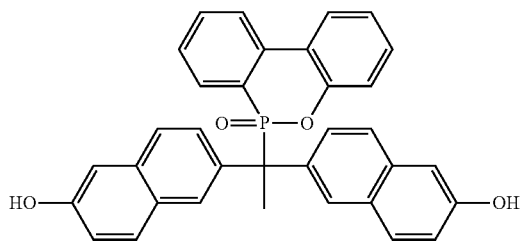

DMP 3

DMP 3 was prepared by mixing and stirring 10.81 g (0.05 mole) of DOPO, 36 g (0.25 mole) of 2-naphthol, 9.01 g (0.05 mole) of 6-acetyl-2-naphthol, and 0.432 g (4 wt % based on the Weight of DOPO) of p-toluene sulfonic acid in a 250 ml three-necked flask reactor at room temperature. The reactants were stirred constantly at 130° C. for 24 hours to form a mixture, and then the temperature of the mixture was cooled down to the room temperature. The crude products were separated out from the cooled mixture and washed with ethanol and then filtrated and dried to obtain a white powder. The white powder was the phosphorus-containing compound A3 ("DMP 3"), shown above.

The yield of the foregoing phosphorus-containing bisphenol was 80%, and the melting point was 338° C. The measured value of the carbon, hydrogen, and oxygen element were 77.69%, 4.17%, and 12.25%, respectively (the theoretical value for C was 77.26%; 4.76% for H; 12.11% for O) by element analysis.

Example 2

Synthesis of Ester-Substituted Phosphorus Curing Agents ("DIA")

Two exemplary ester-substituted phosphorus curing agents (Example DIA 1 and Example DIA 2) were prepared using the DMP 1 from Example 1 in accordance with aspects of the invention.

Example DIA 1

Example DIA 1 was prepared by reacting 285.5 g of DMP 1 from Example 1 (0.66 mol) with 156.5 g of acetic anhydride (1.53 mol) and 55.4 g of isophthalic acid (IPA) (0.33 mol). During the reactions, the temperature was increased to 140° C. and held for 2.5 hrs. The temperature was then increased to 250° C. to distill off the acetic acid, which was a product of the reaction of the acetic anhydride, while a vacuum was applied at 10 torr for 30 minutes ("mins"). The nitrogen was evacuated at a temperature of 250° C. to obtain Example DIA 1, an ester-substituted phosphorus-containing bisphenol compound. The amount of acetic acid removed by distillation was 133.47 grams, which was 95% of the theoretical amount. The glass transition temperature of the above-mentioned Example DIA 1 was 128° C., and FI=IR analysis had obvious C=O absorption at 1742.7 cm-1.

Example DIA 2

Example DIA 2 was prepared by reacting 214.21 g of DMP 1 (0.5 mol) with 117.4 g of acetic anhydride (1.15 mol) and 73.93 g of isophthalic acid (0.445 mol). During the reactions, the temperature was increased to 140° C. and held for 2.5 hrs. The temperature was then increased to 250° C. to distill off the acetic acid while a vacuum was applied at 10 torr for 30 mins. The nitrogen was evacuated at a temperature of 250° C. to obtain Example DIA 2. The amount of acetic acid removed by distillation was 122.27 grams, which was 95% of the theoretical amount. The glass transition temperature of Example DIA 2 was 170° C., and FI=IR analysis had obvious C=O absorption at 1742.7 cm-1.

Comparative Example DIA 1

A comparative example of an ester-substituted phosphorus curing agent (Comparative Example DIA 1) was prepared from DMP 1. Specifically, 214.21 g of DMP1 (0.5 mol) was reacted with 117.4 g of acetic anhydride (1.15 mol) and 74.76 g of isophthalic acid (0.45 mol). The temperature was increased, during the reactions, to 140° C. and held for 2.5 hrs. The temperature was subsequently increased to 250° C. to distill off acetic acid, and a vacuum of 10 torr was applied for 30 mins. The nitrogen was evacuated at a temperature of 250° C. to obtain Comparative Example DIA 1. The amount of acetic acid removed by distillation was 122.85 grams, which was 95% of the theoretical amount. The glass transition temperature of Comparative Example DIA 1 was 179° C., and FI=IR analysis has obvious C=O absorption at 1742.7 cm-1.

Table 1 compares some of the relevant characteristics of Example DIA 1 and 2 to Comparative Example DIA 1.

TABLE 1

| | Ex. DIA 1 | Ex. DIA 2 | Comp. Ex. DIA 1 |
|---|---|---|---|
| DMP:IPA (mol %) | 2:1 | 10:8.9 | 10:9 |
| Repeating unit (w value) | 2 | 9 | 10 |
| Processability | v | v | x |

Processability was determined by dissolving the respective DIA in 40 wt. % MEK, subsequently stirring and heating until the solvent is refluxed (80° C. BP), and then cooled to room temperature, and left to stand overnight. A "v" value was given if no precipitate was observed. A "x" value was given if precipitate was observed at the bottom. The repeating unit ("w") was determined by analyzing the molecular weight using GPC and dividing by the molecular weight of the repeating unit to obtain a repeating unit value.

Example 3

Preparation of Laminated Composite Structure

Epoxy impregnated glass fiber fabrics were produced by impregnating glass fiber fabric (GF-7628) with an epoxy resin and curing it with Example DIA 1 and/or PF8110M60. 2-Methylimidazole ("2MI"), 10% dissolved in methanol, was used as a catalyst for curing the epoxy resin. PF8110M60 is a curing agent manufactured by Chang Chun Plastic Co., Ltd., Taiwan, R.O.C, and distributed under the product number PF8110M60. PF8110M60 is a phenolic resin having an active hydrogen equivalent weight of 100-110 g/equivalent weight. BNE200A is an epoxy resin manufactured by Chang Chun Plastic Co., Ltd., Taiwan, R.O.C. BEP330A is an epoxy resin manufactured by Chang Chun Plastic Co., Ltd., Taiwan, R.O.C.

Table 2, provided below, shows the epoxy resin and curing agent used for each epoxy impregnated glass fiber fabric of Examples A-D and Comparative Example E.

TABLE 2

| Grams | | Ex. A | Ex. B | Ex. C | Ex. D | Comp. Ex. E |
|---|---|---|---|---|---|---|
| Epoxy resin | BNE200A | 100 | 75 | 50 | 50 | |
| | BEP330A | | | | | 317.1 |
| Curing agent | DIA | 178.5 | 178.5 | 178.5 | 178.5 | |
| | PF8110M60 | | | | 39.5 | 98.7 |
| Catalyst | 2MI | 0.07 | 0.06 | 0.05 | 0.07 | 0.11 |

The cured epoxy impregnated glass fiber fabrics were dried at a temperature of 160° C. to form prepregs. Pieces of each of the prepregs were layered with a sheet of copper foil to form a composite structure having a thickness of 2 mm. The composite structure had a single layer of prepreg with two sheets of copper foil adjacent to each side of the prepreg, such that the prepreg was positioned between the two sheets of copper foil. The composite structure was laminated at a temperature of 210° C. under a pressure of 25 kg/cm$^2$. The resulting laminated composite structures contained the phosphorus-containing epoxy resin and glass fiber fabric.

The laminated composite structures were evaluated and their properties are provided in Table 3 below.

TABLE 3

| | Ex. A | Ex. B | Ex. C | Ex. D | Comp. Ex. E |
|---|---|---|---|---|---|
| Dk(10 GHz) | 4.48 | 4.30 | 4.41 | 4.30 | 4.71 |
| DF(10 GHz) | 0.010 | 0.0097 | 0.0101 | 0.0109 | 0.025 |
| Tg° C. | 186.83 | 184.36 | 172.45 | 200.8 | 151.6 |

The laminated composite formed of two sheets of copper foil were etched and the dielectric constant (Dk) and dissipation factor (Df) of were measured according to IPC-TM-650-2.5.5.13. The glass transition temperature ($T_g$) was measured according to IPC-TM-650-2.4.25 by using differential scanning calorimetry (DSC) (Scan Rate: 20° C./min.) and a specimen that was prepared by retrieving 10 mg of resin composition from the prepreg. Typically, it is desirable for epoxy compositions having a DMP structure to have a glass transition temperature of lager than 150°. It was particularly surprising that the cured epoxy resin of laminate composite structure Ex. D exhibited a glass transition temperature of greater than 200° C.

Example 4

Preparation of Laminated Composite Structure

Epoxy impregnated glass fiber fabrics (Example F and Comparative Example G) were produced by impregnating glass fiber fabric (GF-7628) with an epoxy resin and curing it with Example DIA 1, PF8110M60. As noted above, PF8110M60 is a curing agent manufactured by Chang Chun Plastic Co., Ltd., Taiwan, R.O.C. BNE200A is an epoxy resin manufactured by Chang Chun Plastic Co., Ltd., Taiwan, R.O.C. BE504EM is an epoxy manufactured by Chang Chun Plastic Co., Ltd., Taiwan, R.O.C.

The phosphorus content was determined for the cured epoxy resins. Specifically, a standard curve of UV-Vis absorption at 420 nm was prepared from a set of potassium dihydrogen phosphate solutions at various concentrations. Sulfuric acid and potassium persulfate were added into epoxy resin samples. Following a digestion process carried out under a temperature of 100° C. for 60 mins, the digested sample solutions were treated with molybdovanadate reagent to form vanadomolybdophosphoric acid. The samples were measured by UV-Vis absorption at 420 nm. The phosphorus content was determined from the standard curve in mass %.

Table 4, provided below, shows the epoxy resin and curing agent used for each epoxy impregnated glass fiber fabric.

TABLE 4

| Grams ("g") | Ex. F | | Comp. Ex. G | |
|---|---|---|---|---|
| Epoxy resin | BNE200A | 200 | BNE200A | 200 |
| | BE504EM | 20 | BE504EM | 16 |
| Curing agent | Example DIA 1 | 178.4 | DOPO | 111.3 |
| | PF8110M60 | 39.5 | PF8110M60 | 80 |
| Phosphorus content % | 2.3% | | 2.5% | |

The cured epoxy impregnated glass fiber fabrics were dried at a temperature of 160° C. to form prepregs. Five pieces of the prepregs were layered and a sheet of 35 μm copper foil was placed on the top and bottom of the stack of five pieces of prepreg. This structure was laminated at a temperature of 210° C. under a pressure of 25 kg/cm$^2$. The laminated composite structures contained the phosphorus-containing epoxy resin and glass fiber fabric.

The laminated composite structures of Example F and Comparative Example G were evaluated and their properties are summarized in Table 5.

TABLE 5

| | Ex. F | Comp. Ex. G |
|---|---|---|
| Dk[1 MHz] | 4.30 | 4.93 |
| Df[1 MHz] | 0.011 | 0.012 |
| Flame retardancy | V0 | V0 |
| Tg(° C.) | 201 | 189 |
| Td(° C.) | 395 | 380 |
| Heat resistance S-288 | >180 | >180 |

The laminated composite formed of two sheets of copper foil were etched and the Dielectric Constant (Dk) and Dissipation Factor (Df) were measured according to IPC-TM-650-2.5.5.9 at 1 MHz. The flame retardancy was measured according to UL94. A V0 rating means that burning stops within 10 seconds after two applications of ten seconds each of a flame to a test bar, with NO flaming drips being allowed. The glass transition temperature ($T_g$) was measured according to IPC-TM-650-2.4.25 by using Differential Scanning calorimetry (DSC) (Scan Rate: 20° C./min.) and a specimen that was prepared by retrieving 10 mg resin of composition from the prepreg. The decomposition temperature ("Td") (5% weight loss) was measured according to IPC-TM-650-2.3.40 using a thermogravimetric analyzer (TGA) at a scan rate of 10° C./min. The thermal stability ("S-288"), referred to above as heat resistance, was measured according to JIS-C-6481. Specifically, the laminated entity was immersed into a 288° C. solder furnace and the time to delamination measured.

Example 5

Preparation of Cured Epoxy Resin

An epoxy resin was cured using Example DIA 1. BNE200A is an epoxy resin manufactured by Chang Chun Plastic Co., Ltd., Taiwan, R.O.C. 2-Methylimidazole ("2MI"), 10% dissolved in methanol, was used as a catalyst for curing the epoxy resin. The cured epoxy resin of Example H was cured for 2 hrs at a temperature of 210° C. The cured epoxy resin of Example H was assessed to determine various characteristics. The Dielectric Constant (Dk) and Dissipation Factor (Df) were measured according to IPC-TM-650-2.5.5.13 at 5 GHz and 10 GHz. The composition of the epoxy resin as well as the dielectric constant and dissipation factor of the cured epoxy resin are summarized in Table 6.

TABLE 6

|  |  | Ex. H |
|---|---|---|
| Epoxy (g) | BNE200A | 100 |
| Curing agent (g) | Ex. DIA 1 | 178.5 |
| Catalyst (g) | 2MI | 0.07 |
|  | DK(5 GHz) | 3.15 |
|  | DF(5 GHz) | 0.010 |
|  | DK(10 GHz) | 3.02 |
|  | DF(10 GHz) | 0.014 |

What is claimed is:

1. A phosphorus containing compound of formula (I):

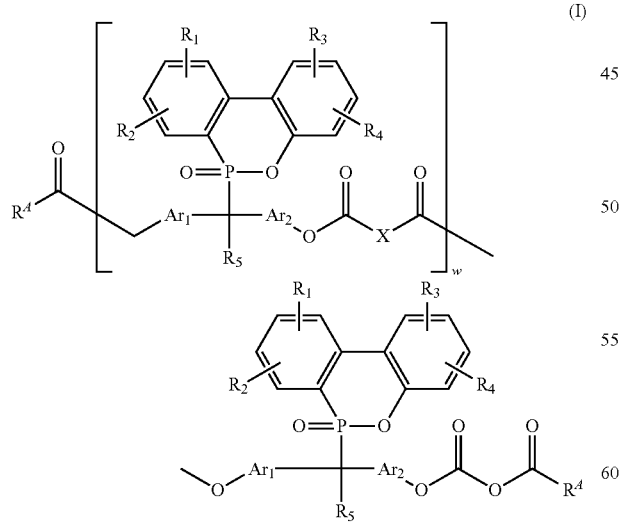

wherein,
X is an aromatic hydrocarbon group having 6 to 30 carbon atoms or a bivalent linear or branched alkylene group of 1 to 8 carbon atoms, $R^A$ is selected from an alkyl group having 1 to 6 carbon atoms, a phenyl group, a napthyl group, and an aromatic phenol group, w is an integer of 1 to 9, $R_1$, $R_2$, $R_3$, and $R_4$ are independently selected from H, $C_1$-$C_{10}$ alkyl, $C_1$-$C_{10}$ alkoxy, and $C_3$-$C_{10}$ cycloalkyl, $R_5$ is selected from the group consisting of $C_1$-$C_{10}$ alkyl, $C_1$-$C_{10}$ alkoxy, $C_3$-$C_{10}$ cycloalkyl, and $Ar_3$, and $Ar_1$ and $Ar_2$ are independently selected from the following structure:

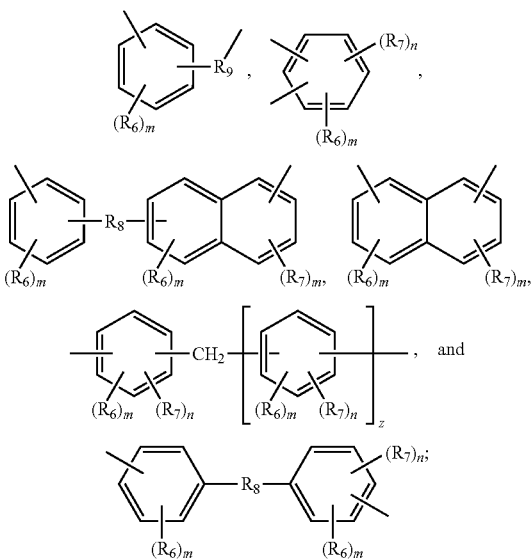

wherein $Ar_3$ is selected from the following structures:

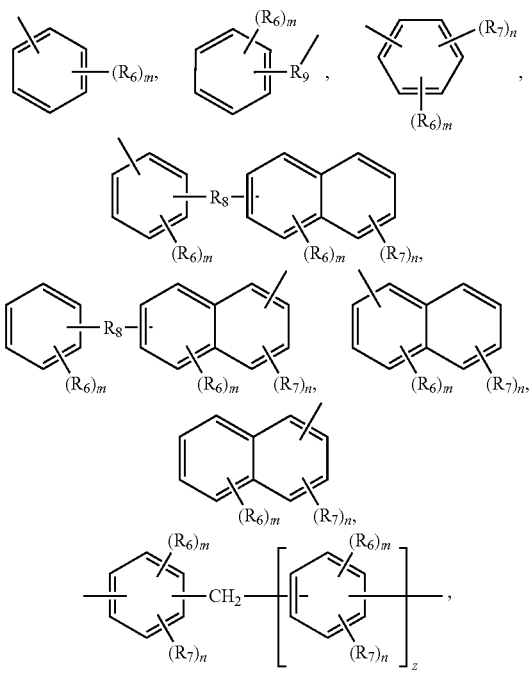

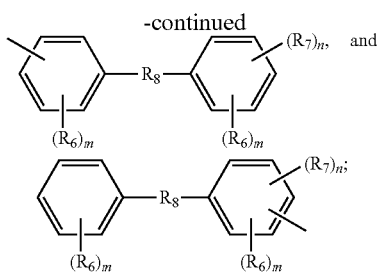

wherein:
$R_6$ and $R_7$ are independently selected from the group consisting of H, $C_1$-$C_{10}$ alkyl group, $C_1$-$C_{10}$ alkoxy, and a cyclic alkyl group having 3-10 carbon atoms,
m and n are independently an integer from 0 to 3, and m plus n is less than 5,
$R_8$ is absent or is selected from the group consisting of —$CH_2$—, —$(CH_3)_2C$—, —CO—, —$SO_2$—, and —O—, and $R_9$ is absent or is —$(CH_2)p$, wherein p is an integer from 1 to 20, and z is 1.

2. The phosphorus containing compound of claim 1, wherein:
$R_1$, $R_2$, $R_3$, and $R_4$ are H, and
$R_5$ is a methyl.

3. The phosphorus containing compound of claim 1, wherein X is an aromatic hydrocarbon group having 6 to 10 carbon atoms.

4. The phosphorus containing compound of claim 3, wherein X is an aromatic hydrocarbon group having 6 to 8 carbon atoms.

5. The phosphorus containing compound of claim 1, wherein X is an unsubstituted aromatic hydrocarbon group having 6 to 30 carbon atoms.

6. The phosphorus containing compound of claim 1, wherein $R^A$ is an aromatic phenol group selected from a phenol group, an o-cresol group, an m-cresol group, a p-cresol group, or a 1-naphthol group.

7. The phosphorus containing compound of claim 1, wherein $R^A$ is an alkyl group having 1-4 carbon atoms.

8. The phosphorus containing compound of claim 7, wherein $R^A$ is an alkyl group having 1 or 2 carbon atoms.

9. The phosphorus containing compound of claim 1, wherein $R^A$ is an unsubstituted alkyl group having 1 to 6 carbon atoms.

10. The phosphorus containing compound of claim 1, wherein
$R_1$, $R_2$, $R_3$, and $R_4$ are H,
$R_5$ is a methyl,
X is an unsubstituted aromatic hydrocarbon group having 6 to 30 carbon atoms, and
$R^A$ is an alkyl group having 1 to 6 carbon atoms.

11. A cured epoxy resin comprising:
(a) an epoxy; and
(b) the phosphorus containing compound of claim 1.

12. The cured epoxy resin of claim 11 having a glass transition temperature of greater than 180° C.

13. The cured epoxy resin of claim 12, wherein the glass transition temperature is 200° C. or more.

14. The cured epoxy resin of claim 11 having a dielectric constant of 3.0 or less as measured according to IPC-TM-650-2.5.5.13 at 10 GHz.

15. The cured epoxy resin of claim 11 having a dissipation factor of 0.014 or less as measured according to IPC-TM-650-2.5.5.13 at 10 GHz.

16. A laminate composite structure comprising:
(a) a glass fiber fabric,
(b) an epoxy,
(c) a copper foil, and
(d) a phosphorus containing compound according to formula (I):

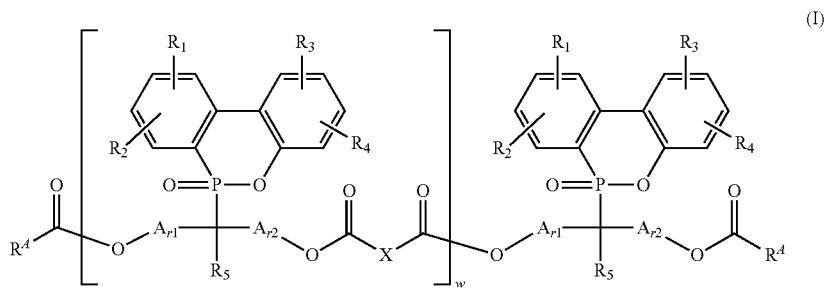

wherein,
X is an aromatic hydrocarbon group having 6 to 30 carbon atoms or a bivalent linear or branched alkylene group of 1 to 8 carbon atoms,
$R^A$ is selected from an alkyl group having 1 to 6 carbon atoms, a phenyl group, a napthyl group, and an aromatic phenol group,
w is an integer of 1 to 9,
$R_1$, $R_2$, $R_3$, and $R_4$ are independently selected from H, $C_1$-$C_{10}$ alkyl, $C_1$-$C_{10}$ alkoxy, and $C_3$-$C_{10}$ cycloalkyl,
$R_5$ is selected from the group consisting of $C_1$-$C_{10}$ alkyl, $C_1$-$C_{10}$ alkoxy, $C_3$-$C_{10}$ cycloalkyl, and $Ar_3$, and
$Ar_1$ and $Ar_2$ are independently selected from the following structure:

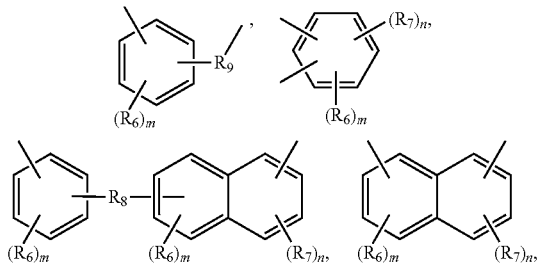

-continued

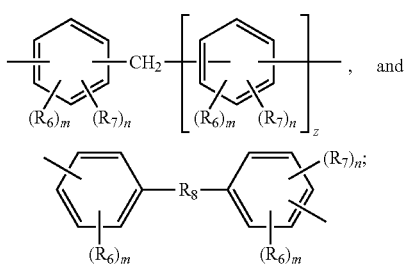

, and wherein Ar₃ is selected from the following structures:

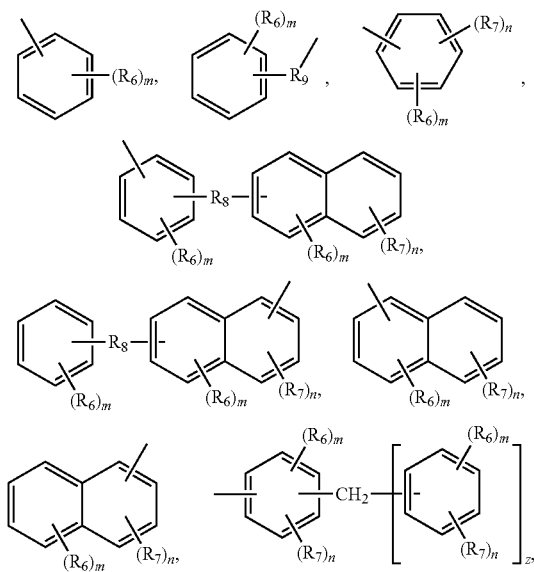

-continued

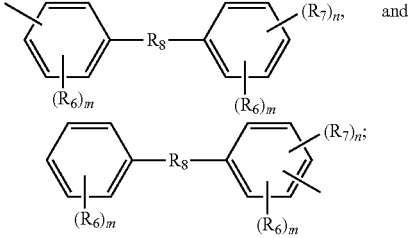

, and wherein:
$R_6$ and $R_7$ are independently selected from the group consisting of H, $C_1$-$C_{10}$ alkyl group, $C_1$-$C_{10}$ alkoxy, and a cyclic alkyl group having 3-10 carbon atoms,
m and n are independently an integer from 0 to 3, and m plus n is less than 5,
$R_8$ is absent or is selected from the group consisting of —$CH_2$—, —$(CH_3)_2C$—, —CO—, —$SO_2$—, and —O—, and
$R_9$ is absent or is —$(CH_2)p$, wherein p is an integer from 1 to 20, and z is 1.

17. The laminate composite structure of claim 16, wherein $R^A$ is an alkyl group having 1 to 6 carbon atoms, $R_1$, $R_2$, $R_3$, and $R_4$ are H, and $R_5$ is a methyl.

18. The laminate composite structure of claim 16, wherein $R_1$, $R_2$, $R_3$, and $R_4$ are H,
$R_5$ is a methyl,
X is an unsubstituted aromatic hydrocarbon group having 6 to 30 carbon atoms, and
$R^A$ is an alkyl group having 1 to 6 carbon atoms.

19. The laminate composite structure of claim 16 having a dielectric constant of 4.6 or less as measured according to IPC-TM-650-2.5.5.13 at 10 GHz.

20. The laminate composite structure of claim 16 having a dissipation factor of 0.015 or less as measured according to IPC-TM-650-2.5.5.13 at 10 GHz.

* * * * *